C. A. HAYDEN.
NUT AND BOLT CONSTRUCTION.
APPLICATION FILED APR. 23, 1913.
1,110,203.
Patented Sept. 8, 1914.
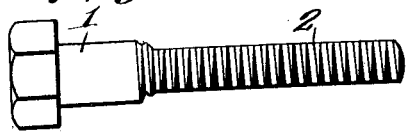
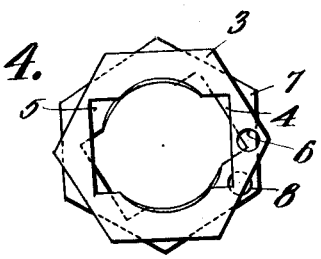
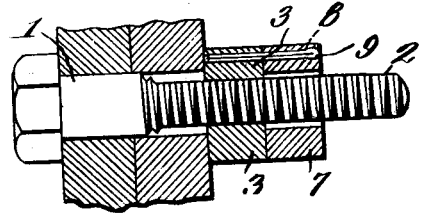
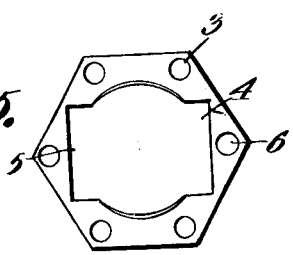
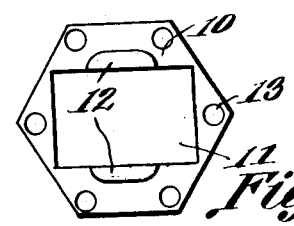
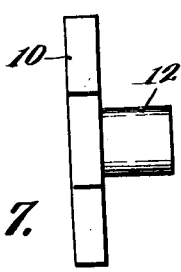
Charles A. Hayden, Inventor
Witnesses
by C. A. Snow & Co.
Attorneys

UNITED STATES PATENT OFFICE.

CHARLES AUSTIN HAYDEN, OF GORHAM, NEW HAMPSHIRE.

NUT AND BOLT CONSTRUCTION.

1,110,203.    Specification of Letters Patent.    Patented Sept. 8, 1914.

Application filed April 23, 1913. Serial No. 763,147.

*To all whom it may concern:*

Be it known that I, CHARLES A. HAYDEN, a citizen of the United States, residing at Gorham, in the county of Coos and State of New Hampshire, have invented a new and useful Improved Nut and Bolt Construction, of which the following is a specification.

This invention relates to certain improvements in the construction of a bolt and the nut therefor.

An object of the present invention is to provide a bolt with the threaded portion thereof provided with milled sides and a mutilated nut adapted to coact with the same to provide means whereby the nut may be positioned upon the bolt by a sliding movement thereon and may then be partially rotated to thereby engage the mutilated threads of the bolt.

A further object is to provide a bolt with milled sides and a mutilated nut whereby in order that the nut may be retracted it is rotated until the mutilated portion of the nut comes adjacent the milled sides of the bolt at which time the threads of the nut and bolt disengage and the nut may be then readily withdrawn from the bolt.

A further object is to provide means whereby the mutilated nut may coact with a similar mutilated nut and locked thereto so that the two nuts may be tightened against an object in the manner of an ordinary bolt and nut.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the drawings accompanying this specification and forming a part thereof the preferable form of my invention is illustrated, in which:—

Figure 1 is a side view in elevation of the bolt. Fig. 2 is an end view of the same. Fig. 3 is a cross sectional view illustrating the bolt with two securing nuts thereon. Fig. 4 is a diagrammatic view illustrating the manner in which two securing nuts are assembled to procure a continuity of threads. Fig. 5 is a plan view of one of the nuts. Fig. 6 is a plan view of a locking washer. Fig. 7 is a side view in elevation of the said locking washer.

Referring to the drawings in which similar reference numerals designate corresponding parts throughout the several views, 1 is a bolt suitably threaded which threads are provided with the milled portions 2.

As illustrated in Fig. 5 of the drawings a nut 3 with the usual threaded aperture extending therethrough is mutilated as at 4 and 5, which term refers to a cutting away of a portion of the side walls of the aperture as at 4 and 5 which when registering with the flat milled sides 2 of the bolt allows the nut to readily slide thereon. The nut 3 is provided with an aperture 6 extending therethrough which aperture is positioned in one corner of the nut.

The nut and bolt being mutilated as described, allows the nut to readily slide upon the bolt when the flat side of the bolt is in alinement with the mutilated portion of the nut and the nut when in the desired position by a slight rotation engages the threads of the bolt in the ordinary manner. From the foregoing it will be readily apparent that the nut may be moved into position or retracted therefrom by a sliding movement which greatly facilitates the positioning of the nut upon the bolt. In order however that the nut may be tightened by means of the bolt threads, a second nut 7 is provided similar in construction to the nut 3 with the exception that the aperture 8 which is adapted to aline with the aperture 6 in the first mentioned nut, is shifted with relation to the longitudinal axis of the mutilated portion so that when the two nuts are positioned upon the bolt as illustrated in Fig. 3 and a suitable locking pin passed through the apertures 8 and 6 the two nuts will be shifted so that the mutilated portion of one nut comes adjacent the threaded portion of the other nut which will provide that one of the nuts will always engage the threads of the bolt from which it will be apparent that the nut 3 may be positioned upon the bolt and moved longitudinally of the same until the desired position thereof is reached after which the nut 7 will be slid upon the bolt into contact with the nut 3 and the two nuts shifted so that the apertures 6 and 8 will be alined and a suitable locking pin 9 inserted therethrough. A wrench may now be secured to the two nuts and the same rotated. The two nuts will act similar to a single nut with continuous threads and therefore a suitable wedging action may be procured by a rotating of the two nuts.

In order to provide positive locking means for a nut the washer 10 as illustrated in Figs. 6 and 7 of the drawings is provided with an opening 11 therein, said opening being of a size sufficient to pass readily over the threaded portion of a bolt and the said aperture 11 is provided with the lips 12 projecting from the side walls thereof, the said lips 12 adapted to contact with the flat milled sides 2 of the bolt and to pass between the side walls of the bolt and the side walls of the nut. The projecting lips 12 of the washer are relatively thicker than the portion of the bolt which has been removed with the result that the said lips 12 may project into the mutilated portions 4 and 5 of the nut and when so positioned it will be impossible for the nut to rotate in either direction as the diameter of the threaded portion of the nut is smaller than the combined thicknesses of the bolt and the two lips.

In the drawings, the nuts 3 and 7 have been represented as of the conventional hexagonal type but it is to be noted that the external shape of the nut may be varied and that the apertures 6 and 8 of the two nuts will be so positioned that when a securing pin is passed therethrough the external surface of the two nuts will be in alinement so that a single wrench may engage both nuts simultaneously so that the same may be rotated. Also, mention is made of the fact that the two apertures will be so positioned with relation to the mutilated portion of the nut that when the said apertures are in alinement, the threaded portion of one nut will be in alinement with the mutilated portion of the other nut to thereby obtain a continuous threaded engagement with the bolt by the two nuts. In the practical use of my improved nut and bolt, the bolt is passed through the material to be secured thereby, which in Fig. 3 of the drawings has been represented as being two boards and the nut 3 slid upon the said bolt and into contact with the outer surface of the board and is then given a slight rotation so as to engage the threads of the bolt. The nut 7 is then positioned to contact with the nut 3 and rotated until the apertures 6 and 8 aline, at which time a suitable securing pin is passed through the same. A wrench may now engage the two nuts and rotate the same with the result that the nuts will be driven forward into forced contact with the board and required pressure exerted thereon. The nut having assumed the desired position the pin 9 is withdrawn and the nut 7 slightly retracted until the mutilated portion thereof alines with the mutilated portion of the bolt at which time it is readily withdrawn from the said bolt and the washer 10 is then inserted upon the bolt with the projecting lips 12 extending between the mutilated portion of the bolt and the mutilated portion of the nut 3, from which it will be apparent that it will be impossible for the nut 3 to rotate in either direction which would result in the nut 3 becoming disengaged from the threaded portion of the bolt. In order to prevent the washer 10 from shifting longitudinally the aperture 13 is formed therein and a suitable cotter pin or equivalent means passed through the aperture 13 and the alining aperture 6 of the nut 3 and the same effectually holds the said washer in position. When it is desired to remove the nut 3 from the bolt the washer is first withdrawn and the nut 3 then slightly rotated either in a forward or reverse direction until the mutilated portion thereof comes into alinement with the mutilated portion of the bolt at which time the nut may be readily retracted from the said bolt by a sliding movement.

It is to be noted that although the present invention has been described and illustrated as embodying bolts and nuts suitably mutilated it is to be understood that the invention may be equally applied to similar tightening means whereby the threads will take the form of grooves or channels, the method of assembling the mutilated nuts upon the bolt in this case being the same as hereinbefore described. The number of nuts which may be assembled upon the bolt for the tightening of the front nut may be varied and the positioning of the apertures therein may also be varied so that efficient holding means is obtained upon the threaded portion of the bolt. In some cases it will be understood that the two nuts will be left upon the bolt and the washer inserted behind the last one. The nuts may be quickly and easily slid into position upon the bolt and by a slight rotating of the same suitably tightened. Also when it is desired to remove the nuts a slight rotation of the same after the two nuts have been disengaged one from the other, allows the same to be readily retracted from the bolt and slid therefrom. Mention is also made of the fact that the nuts 3 and 7 may have a plurality of the apertures 6 formed therein as illustrated in Fig. 5, which remark also holds true with respect to the washer illustrated in Fig. 6. Mention is also made of the fact that the inner opening of the aperture 6 is enlarged so that the cotter pin may be inserted with the head portion therein which will prevent any chance of the cotter pin being disengaged from the nuts.

Having thus fully described the invention what I claim to be new and original with me is:—

1. The combination with a bolt provided with a mutilated threaded portion, of a plurality of nuts provided with mutilated threaded apertures extending therethrough, means for holding the threaded portions of said nuts out of alinement to preserve the continuity of the nut threads, and means for locking the said nuts against rotation with respect to the said bolt.

2. The combination with a bolt provided with a mutilated threaded portion, of a plurality of nuts provided with mutilated threaded apertures extending therethrough and means including a locking washer for locking the said nuts against rotation with respect to the said bolt.

3. The combination with a bolt provided with a mutilated threaded portion, of a plurality of nuts provided with mutilated threaded apertures extending therethrough, means for holding the threaded portions of said nuts out of alinement to preserve the continuity of the nut threads, and means including a locking washer non-rotatably engaging the said bolt adapted to hold the said nuts against rotation with respect to the said bolt.

4. The combination with a bolt provided with a mutilated threaded portion, of a plurality of nuts provided with mutilated threaded apertures extending therethrough, and means for holding the threaded portions of said nuts out of alinement to preserve the continuity of the nut threads, and a locking washer adapted to non-rotatably and slidably engage the bolt and to slidably and non-rotatably engage one of said nuts to hold said nuts and bolt against relative rotation.

5. In a device of the class described, a bolt provided with a mutilated threaded portion, a plurality of nuts provided with mutilated threaded apertures extending therethrough, means for holding the threaded portions of said nuts out of alinement to preserve the continuity of the nut threads, a locking washer adapted to non-rotatably and slidably engage said bolt, said washer provided with projecting lips adapted to register and fit between the mutilated portions of said bolt and said nut, to thereby prevent the relative rotation of the said nuts and bolt.

6. In a device of the class described, the combination of a bolt provided with a mutilated threaded portion, a plurality of nuts provided with mutilated threaded apertures extending therethrough, means for holding the threaded portions of said nuts out of alinement to preserve the continuity of the nut threads, a locking washer provided with an aperture extending therethrough, said aperture of such size as to slidably and non-rotatably engage the said mutilated threaded portion of said bolt, said locking washer provided with projecting lips insertible between the mutilated threaded portions of said bolt and said nuts, and means engaging the said locking washer and said nuts preventing the relative shifting of said locking washer and said nuts, the said locking washer preventing the relative rotation of said bolt and nuts.

7. In a device of the class described, the combination of a bolt provided with a mutilated threaded portion, a plurality of nuts provided with mutilated threaded apertures extending therethrough, means for holding the threaded portions of said nuts out of alinement to preserve the continuity of the nut threads, the said nuts adapted to shift longitudinally of the said bolt, when the threaded portions of said nuts are held in alinement, a locking washer slidably and non-rotatably engaging the said bolt, said locking washer slidably and non-rotatably engaging the said nuts, said means for holding the threaded portions of the nuts out of alinement adapted to engage the said locking washer and prevent the relative shifting of said locking washer and said nuts.

8. In a device of the class described the combination of a bolt provided with a mutilated threaded portion, a plurality of nuts provided with mutilated threaded apertures extending therethrough, said nuts provided with a plurality of spaced apertures extending therethrough, a locking washer slidably and non-rotatably engaging the said bolt, said locking washer slidably and non-rotatably engaging said nuts, said nut locking washer provided with a plurality of spaced apertures extending therethrough, adapted to aline with the apertures of said nuts, and means extending through the apertures of the said locking washer and said nuts adapted to hold the locking washer against shifting with relation to the nuts, and said means adapted to hold the threaded portions of said nuts out of alinement to preserve the continuity of the nut threads.

9. The combination with a bolt provided with a mutilated threaded portion, of a plurality of nuts provided with mutilated threaded apertures extending therethrough and means for holding the threaded portions of said nuts out of alinement to thereby preserve the continuity of the nut threads.

10. The combination of a bolt provided with a mutilated threaded portion, a plurality of nuts provided with mutilated threaded apertures extending therethrough, means for holding the threaded portions of said nuts in alinement to allow the said nuts to shift longitudinally of the bolt, said means adapted to hold the threaded portions of said nuts out of alinement to thereby preserve the continuity of the nut threads and to continuously engage the threaded portion of said bolt.

11. In a device of the class described, a bolt provided with a mutilated threaded portion, a primary nut provided with a mutilated threaded aperture extending therethrough, and a secondary nut provided with a mutilated threaded aperture extending therethrough, said primary and secondary nuts provided with auxiliary apertures extending therethrough, means extending through said auxiliary apertures for holding said auxiliary apertures in alinement, said last mentioned apertures so positioned that the threaded portions of said nuts may be held in and out of alinement when different pairs of said auxiliary apertures are alined, said nuts adapted to threadedly engage the said bolt.

12. In a device of the class described, the combination of a bolt provided with a mutilated threaded portion, a nut provided with a mutilated threaded aperture extending therethrough, and provided with an auxiliary aperture spaced therefrom, ring-shaped means embracing and slidably and non-rotatably engaging the said bolt and nut adapted to lock the same against relative rotation, said ring-shaped means provided with an aperture extending therethrough and adapted to aline with the nut auxiliary aperture, and means extending through the nut auxiliary aperture and said ring-shaped means aperture, interlocking therewith and adapted to hold said nut and ring-shaped means against relative shifting and the nut and bolt against relative rotation.

13. In a device of the class described, the combination of a bolt provided with a mutilated threaded portion, a nut provided with a mutilated threaded aperture extending therethrough, and a locking washer adapted to non-rotatably and slidably engage said bolt, said washer provided with projecting lips adapted to register with the mutilated portion of said bolt and adapted to extend between the mutilated portions of said bolt and nut to thereby prevent relative rotation of the same, said washer and nut provided with alined apertures extending therethrough, and means extending through said apertures adapted to prevent the relative shifting of said nut and washer.

14. In a device of the class described, the combination of a bolt provided with a mutilated threaded portion, a nut provided with a mutilated threaded aperture extending therethrough, a locking washer adapted to non-rotatably and slidably engage said bolt and to slidably and non-rotatably engage said nut to hold the said bolt and nut against relative rotation, and means engaging the said locking washer and said nut adapted to hold the same against relative shifting.

15. In a device of the class described, the combination of a bolt provided with a mutilated threaded portion, a nut provided with a mutilated threaded aperture extending therethrough, a locking washer including projecting lips insertible between the mutilated portion of the nut apertures and the mutilated portion of the bolt when the same are in registration, and means extending through the said locking washer and said nut adapted to hold the said washer and nut against relative shifting.

In testimony that I claim the foregoing as my own, I have hereto affixed my signature in the presence of two witnesses.

CHARLES AUSTIN HAYDEN.

Witnesses:
 VICTOR GAYLORD HEATH,
 CLARENCE BYRON LAFFIN.